Figure 1:
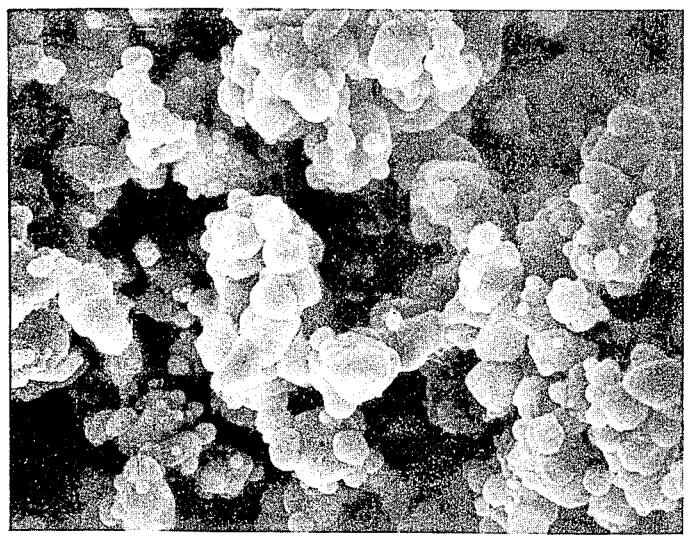

United States Patent [19]

Iacovangelo et al.

[11] 4,423,122

[45] Dec. 27, 1983

[54] ELECTRODE FOR MOLTEN CARBONATE FUEL CELL

[75] Inventors: Charles D. Iacovangelo, Schenectady; Kenneth P. Zarnoch, Clifton Park, both of N.Y.

[73] Assignee: General Electric Company, Schenectady, N.Y.

[21] Appl. No.: 371,896

[22] Filed: Apr. 26, 1982

[51] Int. Cl.³ .............................................. H01M 27/04
[52] U.S. Cl. ..................................... 429/45; 429/220; 429/223; 204/293
[58] Field of Search .................. 429/45, 220, 223, 40, 429/44; 106/1.12, 1.13, 1.18, 1.22, 1.23; 501/153, 134; 427/305; 204/293

[56] References Cited

U.S. PATENT DOCUMENTS 3,400,019  9/1968  Le Duc .............................. 429/44 X
4,361,631  11/1982  Iacovangelo ........................... 429/40

Primary Examiner—Brian E. Hearn
Assistant Examiner—Gerard P. Rooney
Attorney, Agent, or Firm—Jane M. Binkowski; James C. Davis, Jr.; James Magee, Jr.

[57] ABSTRACT

A sintered porous electrode useful for a molten carbonate fuel cell is produced which is composed of a plurality of 5 wt. % to 95 wt. % nickel balance copper alloy encapsulated ceramic particles sintered together by the alloy.

5 Claims, 2 Drawing Figures

ELECTRODE FOR MOLTEN CARBONATE FUEL CELL

The Government of the United States of America has rights in this invention pursuant to Department of Energy Contract No. DE-AC-02-80ET17019.

The present invention relates to the production of an electrode composed of a plurality of NiCu alloy encapsulated ceramic particle sintered together by the alloy. The electrode is useful for a molten carbonate fuel cell.

The use of porous nickel sintered plaques as electrodes in molten carbonate fuel cells has been widespread. In general these electrodes are high performance electrodes. These electrodes, however, suffer from two pivotal problems. First of all, is the high cost of nickel and secondly, these electrodes sinter with time resulting in a loss of surface area, altering of the pore size distribution in the plaque, and loss of performance over the 40,000 hour required life of an operating cell. The present invention overcomes these problem areas by utilizing an electrode composed of alloy encapsulated ceramic particles.

The significant feature of this new method is to electroless plate two metals onto a non-sintering ceramic particle. This reduces the overall cost of the electrode by decreasing the amount of metal (generally nickel) used and replacing it with a low cost material. By plating the metal onto the non-sintering ceramic particle, the morphology does not change significantly with time due to the sintering of the metal.

Ser. No. 194,474 filed on Oct. 6, 1980 for ELECTRODE MATERIAL FOR MOLTEN CARBONATE FUEL CELLS, now abandoned in favor of continuation Ser. No. 360,073 (RD-14,267) now U.S. Pat. No. 4,361,631 for C. D. Iacovangelo and K. P. Zarnoch, assigned to the assignee hereof and incorporated herein by reference, discloses electroless plating nickel or copper on ceramic particles selected from the group consisting of lithium aluminate, strontium titanate, $\alpha$-alumina and mixtures thereof, said nickel or copper encapsulating the ceramic particle, and sintering the plated particles by means of the encapsulating nickel or copper producing an electrode useful for a molten carbonate fuel cell.

These single metal plated powders were difficult to fabricate into electrode structures requiring long fabrication times at high temperatures under pressure due to low wettability of the ceramic particle by the metal exhibited during sintering. Specifically, when ceramic powder plated only with nickel or copper is sintered, the metal tends to ball up and pull away from the ceramic substrate. According to the present invention, by plating a particular composition of Ni and Cu onto the ceramic particles, these problems are overcome. These new NiCu plated powders have completely different characteristics and surface properties from the single metal plated powders. These differences result in NiCu plated powders which are lower cost and easier to fabricate, i.e. these NiCu plated ceramic particles sinter readily to each other exhibiting significantly enhanced wetting and necking making production on a commercial scale feasible.

The present plated NiCu composition is electrochemically active for the reactions of the molten carbonate fuel cell. At the anode, hydrogen in the fuel gas reacts with carbonate ions from the electrolyte to form water and carbon dioxide:

$$H_2 + CO_3^= \rightarrow H_2O + CO_2 + 2e^-.$$

At the cathode, oxygen and carbon dioxide react to form carbonate via the overall reaction:

$$\tfrac{1}{2}O_2 + CO_2 + 2e^- \rightarrow CO_3^=.$$

Figure 2:
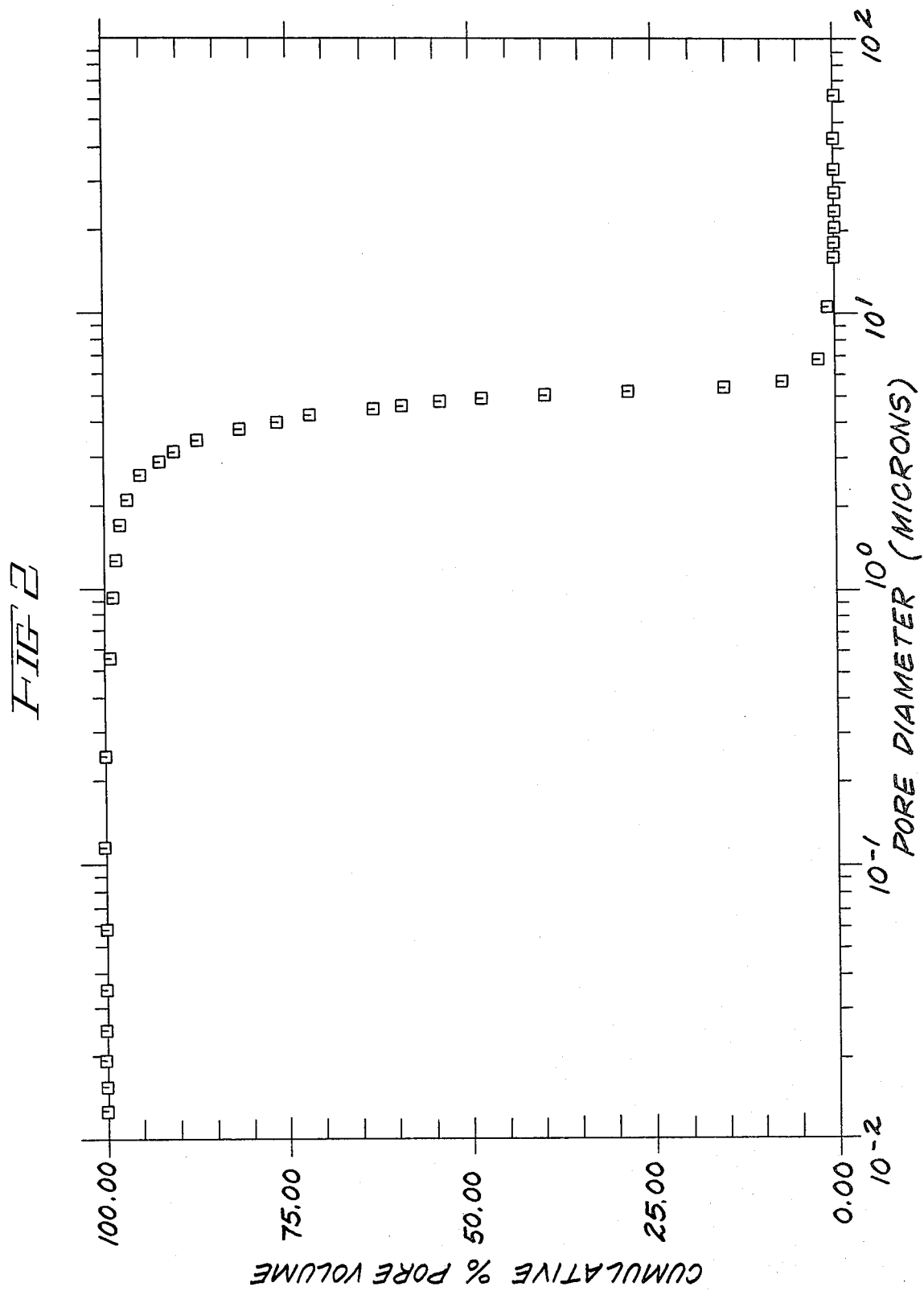

Those skilled in the art will gain a further and better understanding of the present invention from the detailed description set forth below, considered in conjunction with the figure accompanying the forming a part of the specification, in which:

FIG. 1 is a scanning electron micrograph (magnified 3000X) of the surface of the present electrode; and FIG. 2 shows on a semi-logarithmic scale the pore size and cumulative pore volume of an electrode of the present invention produced by mercury intrusion porosymmetry.

Briefly stated, the present invention is directed to a porous sintered electrode useful for a molten carbonate fuel cell consisting essentially of a plurality of nickel copper alloy encapsulated ceramic particle sintered together only by means of said alloy without significant exposure of said ceramic particles, said electrode having a pore volume greater than 40% by volume but less than 85% by volume of the electrode and a pore size ranging from about 0.1 micron to about 20 microns, said alloy being composed of about 5 weight % to about 95% weight % nickel balance copper, said ceramic particles ranging in size from about 0.1 micron to about 20 microns and being selected from the group consisting of lithium aluminate, strontium titanate, $\alpha$-alumina and mixtures thereof.

The present electrode is produced by a method which comprises electroless plating ceramic particles with about 5 weight % to about 95 weight % nickel balance copper, preferably 10 weight % to 80 weight % nickel balance copper, said ceramic particles ranging in size from about 0.1 micron to about 20 microns and being selected from the group consisting of lithium aluminate, strontium titanate, $\alpha$-alumina and mixtures thereof, and sintering a body of said plated particles together at a temperature ranging from about 800° C. to about 1000° C. in an atmosphere in which they are substantially inert, said nickel and copper alloying producing a porous electrode sintered together only by means of said nickel copper alloy without significant exposure of said ceramic particles.

The present ceramic particles are non-sintering or substantially non-sintering at the operating temperatures of the molten carbonate fuel cell. By non-sintering it is meant that the ceramic particles do not bond or fuse directly to each other at the operating temperatures ranging from about 500° C. to about 900° C. The present ceramic particles are selected from the group consisting of lithium aluminate, strontium titanate, $\alpha$-alumina and mixtures thereof.

The size of the ceramic particles which are electroless plated depends largely on the thickness of the NiCu composition to be deposited thereon and also on the pore size desired in the electrode fabricated therefrom. The specific thickness of the NiCu composition plated on the ceramic powder depends largely on the size of the ceramic powder. For example, for the same metal loading, there is produced an increasing plated metal thickness with increasing ceramic particle size. Generally, the total amount of metal plated on the ceramic powder ranges from about 30 weight % to about 80 weight %, and preferably from about 50 weight % to about 70 weight %, of the total weight of the NiCu coated ceramic powder. Generally, the ceramic particle ranges in size from about 0.1 micron to about 20 microns, and preferably from about 0.1 micron to 5 microns. If desired, in one embodiment of the present invention, ceramic particles of plural or distributed size can be electroless plated to produce NiCu encapsulated particles of plural or distributed size wherein the thickness of the encapsulating metal is substantially the same. In another embodiment of the present invention, ceramic particles of substantially the same size can be electroless plated to deposit the enveloping metal in a range of thicknesses producing NiCu encapsulated ceramic particles of plural or distributed size. Ceramic powders of distributed or plurality size are useful for fabricating an electrode of distributed or plurality pore size since pore size of the present electrode is largely determined by the size of the metal-enveloped ceramic particles.

Since the starting particles are ceramic, their surfaces must first be treated with a catalyst to initiate electroless deposition. Preferably, their surfaces are catalyzed by the reaction product of stannous chloride and palladium chloride or silver nitrate. Such catalysis is carried out by a two-step process. For example, the surfaces of the ceramic powder can be coated with catalyst by first suspending the powder in an aqueous HCl solution of stannous chloride, recovering, washing and drying the powder, and then suspending the powder in an aqueous HCl solution of palladium chloride, recovering, washing and drying the powder. The resulting catalyzed powder is then ready to be electroless plated.

In the present invention electroless plating can be defined as the deposition of a continuous or at least a substantially continuous encapsulating or enveloping coating of the present NiCu composition on catalyzed ceramic particles dispersed in an aqueous plating bath or solution by the interaction of a salt of the metal and a reducing agent. By at least a substantially continuous encapsulating or enveloping coating of metal it is meant herein that there is no significant exposure of the ceramic particles.

In the present invention, ceramic particles must be electroless plated since they must be completely enveloped, i.e. encapsulated by the metal coating, or at least substantially completely enveloped with the metal coating so that there is no significant exposure of the ceramic particle surface. Other plating or coating techniques do not involve suspension of a powder, such as the present fine ceramic powder, in a coating medium, and therefore, cannot produce the present NiCu encapsulated ceramic particle in a useful amount within an economically practical time period. The present electroless plating bath is comprised of an aqueous solution of a metal salt, a reducing agent, a chelating agent and a pH adjustor. Specifically, the bath contains ions of the metal which are reduced by the reducing agent under certain conditions determinable empirically such as, for example, certain pH and temperatures required for plating. Such plating baths are commercially available. Representative of the salts of nickel and copper which are useful are the nitrates, chlorides, acetates and sulfates. Representative of useful reducing agents are sodium hypophosphite and formaldehyde. Representative of useful pH adjustors are sodium hydroxide and hydrochloric acid. Representative of the chelating agents are sodium citrate and potassium sodium tartrate. The specific amount of each dissolved component in the bath depends largely on the rate of plating desired and is determinable empirically. In general, the rate of plating is decreased by decreasing the metal ion concentration of the solution, decreasing the pH, decreasing the temperature, and decreasing the amount of ceramic particles suspended in the plating bath.

The catalyzed ceramic particles are dispersed in the plating bath and kept in suspension therein until the plated composition is of the desired thickness suitable for fabrication into the desired electrode for a molten carbonate fuel cell. The particles can be kept in suspension by a number of techniques such as, for example, by stirring the bath or bubbling a gas therethrough which has no significant deleterious effect on the plating process. As a minimum, plating of the particles should be carried out to produce particles with an enveloping or encapsulating NiCu composition which is continuous or at least substantially continuous and at least sufficiently thick so that the plated particles can be sintered together by the encapsulating NiCu alloy without significantly exposing the surface of the ceramic particles.

The present composition plated on the ceramic particle is composed of from about 5 weight % to about 95 weight % Ni balance Cu. For best results, the composition consists essentially of about 83 weight % Ni 17 weight % Cu. The NiCu plated composition forms an alloy when heated to sintering temperature, and usually at sintering temperature. The alloy encapsulated ceramic particles sinter together readily, and, when sintered, exhibit significantly enhanced wetting and necking between particles.

The present electrode can be produced by a number of sintering techniques. Preferably, a body of the encapsulated particles is sintered between plates, such as graphite plates, utilizing means on the supporting plate to maintain the desired size of the deposited powder. The top plate provides a minor but sufficient pressure, usually less than 1 psi, which prevents formation of voids, i.e. excessively large pores, during sintering. For example, the NiCu-encapsulated ceramic powder can be deposited on a suitable substrate or plate, such as graphite in the size, shape, and thickness desired, and ordinarily, it is in the form of a layer.

The present sintering is carried out at a temperature at least sufficient to sinter the contacting metal-enveloped ceramic particles to each other without exposing, or without significantly exposing, the surfaces of the ceramic particles. Generally, sintering temperature ranges from about 700° C. to about 1100° C., and preferably it is about 1000° C. A sintering temperature below about 700° C. will not produce the present sintered electrode, whereas a temperature above about 1100° C. provides no significant advantage. Generally, sintering time ranges from about 15 minutes to about 3 hours.

The present sintering is carried out in an atmosphere in which the components are substantially inert, i.e. an atmosphere which has no significant deleterious effect on the resulting anode composite. Representative of such a sintering atmosphere is argon, hydrogen, mixtures thereof, and a vacuum. During sintering, the contacting alloy encapsulated ceramic particles neck with each other by means of the alloy.

The present electrode usually is in the form of a plate or plaque.

The present electrode has a pore volume greater than about 40% by volume but less than about 85% by volume of the electrode. Preferably, the electrode has a pore volume greater than about 50%, since the higher the surface area and pore volume of the electrode, the better is its performance. The specific pore volume and pore size or pore size distribution is determinable empirically and depends largely on the porosity of the matrix supporting the carbonate electrolyte as well as the operating conditions of the cell. For best results, the electrode should have a pore volume and pore size distribution which allow enough electrolyte to enter it to accomplish reaction but not so much as to "flood" it to the point where the reacting gas cannot diffuse rapidly to the reaction sites of the electrode. Small pores retain electrolyte in preference to large pores. Preferably, therefore, the electrode should have some percentage of pores which are smaller than the largest pores in the electrolyte matrix "tile" to retain electrolyte and a larger percentage of pores which are greater than pores in the tile so as to remain dry. Generally, the median pore size or diameter in the electrode ranges from about 1 micron to about 8 microns, and typically from about 2 microns to about 6 microns. Suitable surface areas are attained with an electrode ranging in thickness from about ($100\mu$) to about ($1500\mu$).

The present electrode does not change, or does not change significantly, in morphology during operation in a molten carbonate fuel cell.

The invention is further illustrated by the following examples:

EXAMPLE 1

In this example strontium titanate ($SrTiO_3$) particles having an average particle size of 2 microns were electroless plated with nickel and copper.

About 1000 ml of an aqueous solution composed of 10 grams/liter $SnCl_2$ and 40 ml/liter HCl was prepared for sensitizing the surfaces of the $SrTiO_3$ powder. About 100 grams of $SrTiO_3$ powder were suspended in the sensitizing solution by means of a magnetic stirring bar for 15 minutes at room temperature. The suspension was then filtered, washed with distilled water and dried in air at room temperature.

About 250 ml of an aqueous activating solution of 4 grams/liter $PdCl_2$ with a pH adjusted to pH 3 with HCl was used. The sensitized $SrTiO_3$ powder was suspended in the activating solution with a magnetic stirring bar at room temperature for about 15 minutes, then filtered, washed with distilled water and dried in air at room temperature producing catalyzed $SrTiO_3$ powder.

The copper plating solution was prepared by forming a solution of 30.0 grams $CuSO_4.5H_2O$, 1500 ml distilled water, 15.0 grams $NaHCO_3$, 45.0 grams $C_4H_4O_6KNa.4H_2O$, and 30.0 grams NaOH. 5 grams of the sensitized activated $SrTiO_3$ powder were dispersed in the resulting solution and were maintained in suspension by means of a magnetic stirrer. About 50 ml HC(O)H (37% solution), the reducing agent, was added to the suspension dropwise. All of the copper plating was carried out at about room temperature, i.e. about 25° C. Within a few minutes, the copper plating reaction occurred as evidenced by the evolution of gas. After about 15 minutes, the copper plating reaction was completed at which time the particles appeared coppery in color.

The solution was filtered and the recovered copper coated particles were washed with distilled water and dried in air. The resulting metal-coated powder was free flowing, coppery in color and contained copper in an amount of about 60% by weight of the total weight of the copper coated particles.

The nickel plating solution was prepared by dissolving 28 grams $Ni(OAc)_2.4H_2O$ in 700 ml distilled water. The solution was maintained at about 70° C. throughout plating.

10 grams of the copper plated $SrTiO_3$ powder was suspended in the 70° C. solution by means of a magnetic stirring bar and maintained in suspension throughout plating. The reducing agent, 11 ml $NH_2NH_2.H_2O$, was added to the suspension dropwise. Within a few minutes plating was initiated, i.e. visible reaction occurred as evidenced by the initially coppery colored $SrTiO_3$ particles turning a gray color and by evolution of $H_2$ gas. Plating reaction was completed in approximately 30 minutes. Reaction completion was evidenced by the absence of $H_2$ gas bubbling in the solution and the reduction in the intensity of the green color of the nickel plating solution to near colorless. The nickel plated $SrTiO_3$ particles were filtered from the solution, washed with distilled water and dried in air at room temperature.

The nickel copper coated particles were free flowing and grey in color. Its composition is given in Table I.

To carry out sintering, Grafoil® sheet was positioned on the surface of a graphite plate to produce a cavity 2" square and 0.120" deep. The metal coated powder was deposited in the cavity substantially filling it producing a smooth layer about 0.120" thick. Grafoil® (0.120" thick) sheet was placed on top of the deposited layer of powder and covered it substantially completely. A 5" square graphite plate was placed on top of the Grafoil® covering it completely and pressure was applied to press the powder at room temperature under about 2000 psi. The applied pressure was then removed.

A 2.5 kg steel plate was placed on top of the top graphite plate so that the body would shrink substantially only in thickness during sintering, and the resulting structure was then heated in an atmosphere comprised of 10% by volume hydrogen balance argon to a sintering temperature of 1000° C. After 3 hours at 1000° C., the power was shut off and the product was furnace cooled to room temperature. The resulting sintered electrode was in the form of a plate, and it was substantially uniform in structure.

Example 1 is illustrated in Table I.

The procedure used in the tabulated examples of Table I was substantially the same as that disclosed in Example 1 except as noted in the Table and as mentioned herein. Specifically, in Examples 2-5 $NH_4OH$ was added to the nickel plating solution producing a solution with a pH of 7.8. Also, in Examples 4 and 5, the activating solution contained silver nitrate instead of palladium chloride, and the nickel plating solution contained nickel sulfate instead of nickel acetate.

In Table I the porosity given in % by volume and median pore size of the sintered product was determined by mercury intrusion porosimetry.

Also, in all of the Examples of Table I, sintering temperature was 1000° C. and sintering atmosphere was comprised of 10% by vol hydrogen balance argon.

TABLE I

| Example | Metal-Encapsulated SrTiO₃ Powder (weight %) | SrTiO₃ Powder Avg Size (μ) | Dimensions Before Cold Pressing (in) | Cold Pressing Pressure (psi) | Sintering Time (hrs) | Sintered Electrode Thickness inch (μ) | Sintered Electrode Porosity % by vol of Electrode | Sintered Electrode Median Pore Size (μ) |
|---|---|---|---|---|---|---|---|---|
| 1 (A-75) | 36 Cu:40 Ni:20 SrTiO₃ | 2 | 0.120" × 2" × 2" (thickness in μ 3050) | 2000 | 3 | 0.028" (710μ) | 68.03 | 2.4 |
| 2 (A-76) | 40 Cu:40 Ni:20 SrTiO₃ | 2 | 0.120" × 2" × 2" (thickness in μ 3050) | 0 | 3 | 0.037" (940μ) | 77.53 | 5.3 |
| 3 (A-105) | 8.3 Cu:41.7 Ni:50 SrTiO₃ | 5 | 0.130" × 5" × 5" (thickness in μ 3300) | 1600 | 38 | 0.058" (1500μ) | 60.36 | 10.4 |
| 4 (A-120) | 8.3 Cu:41.7 Ni:50 SrTiO₃ | Between 2-4 | 0.045" × 5" × 5" (thickness in μ 1100) | 1600 | 1 | 0.022" (560μ) | 68.18 | 4.6 |
| 5 (A-131) | 8.3 Cu:41.7 Ni:50 SrTiO₃ | Between 2-4 | 0.075" × 5" × 5" (thickness in μ 1900) | 1600 | 1 | 0.039" (990μ) | 64.70 | 4.8 |

Examples 1–5 of Table I illustrate the present invention. In Examples 1–5, each of the sintered electrodes was in the form of a plate, i.e. plaque, and each was substantially uniform in structure. All of these sintered electrodes had substantially the same length and width as the unsintered body before cold pressing and all had sufficient strength for handling purposes.

All of the sintered electrodes appeared to be strongly bonded. Based on a series of other experiments and on the characteristics of the sintered electrodes produced in Examples 1–5, it was determined that all of the sintered electrodes of Examples 1–5 would be useful as an electrode in a molten carbonate fuel cell.

Analysis by mercury intrusion porosimetry of the sintered electrode produced in Example 5 is shown in FIG. 2. The curve in FIG. 2 shows that the electrode has a porosity and pore size distribution which would make it useful as an electrode in a molten carbonate fuel cell.

EXAMPLE 6

Copper and nickel plated SrTiO₃ powder prepared in substantially the same manner and having the same composition as set forth in Example 5 was sintered in substantially the same manner as set forth in Example 5 except that in this example a layer of this powder, which comprised the electrode-forming layer, was deposited on another layer of nickel and copper encapsulated SrTiO₃ powder of different composition and size and, therefore, a sintered composite was produced.

The face of the sintered electrode component is shown in FIG. 1 and illustrates the substantially uniform structure of the present electrode.

Copending application, Ser. No. 371,879 (RD-12,722), filed on even date herewith for Iacovangelo and Zarnoch, for ANODE COMPOSITE FOR MOLTEN CARBONATE FUEL CELL, assigned to the assignee herein and incorporated herein by reference, discloses an anode composite useful for a molten carbonate fuel cell comprised of a porous sintered metallic anode component having a porous bubble pressure barrier integrally sintered to one face thereof, said barrier being comprised of metal coated ceramic particles sintered together and to said anode by means of said metal coating, said metal coating enveloping said ceramic particle and being selected from the group consisting of nickel, copper and alloys thereof, the median pore size of the barrier being significantly smaller than that of the anode.

What is claimed is:

1. A porous sintered electrode useful for a molten carbonate fuel cell consisting essentially of a plurality of alloy encapsulated ceramic particle sintered together only by means of said alloy, said alloy being composed of about 5 weight % to about 95% weight % nickel balance copper, said ceramic particles ranging in size from about 0.1 micron to about 20 microns and being selected from the group consisting of lithium aluminate, strontium titanate, α-alumina and mixtures thereof, said electrode having a pore volume greater than 40% by volume but less than 85% by volume of the electrode and a pore size ranging from about 0.1 micron to about 20 microns.

2. The electrode of claim 1 wherein said ceramic particles are in a range of sizes and wherein the thickness of said encapsulating alloy is substantially the same.

3. The electrode of claim 1 wherein said ceramic particles are all substantially the same size and wherein said encapsulating alloy is in a range of thicknesses.

4. A porous sintered electrode useful for a molten carbonate fuel cell consisting essentially of a plurality of alloy encapsulated ceramic particle sintered together only by means of said alloy, said alloy being composed of about 10 weight % to about 80% weight % nickel balance copper, said ceramic particles ranging in size from about 0.1 micron to about 20 microns and being selected from the group consisting of lithium aluminate, strontium titanate, α-alumina and mixtures thereof, said electrode having a pore volume greater than 40% by volume but less than 85% by volume of the electrode and a median pore size ranging from about 1 micron to about 8 microns.

5. The porous sintered electrode according to claim 4 wherein said alloy is composed of about 83 weight % nickel balance copper and said ceramic particles range in size from about 0.1 micron to about 5 microns and said median pore size ranges from about 2 microns to about 6 microns.

* * * * *